United States Patent [19]

Bowers

[11] 4,248,345

[45] Feb. 3, 1981

[54] PROTECTIVE CAP FOR A MAGNETIC RECORDING TAPE CASSETTE

[76] Inventor: Robert C. Bowers, 11123 Rolling Springs Dr., Carmel, Ind. 46032

[21] Appl. No.: 42,038

[22] Filed: May 24, 1979

[51] Int. Cl.³ .................. B65D 85/67; B65D 45/00; B65D 59/02
[52] U.S. Cl. ................... 206/387; 220/307; 242/199
[58] Field of Search ........... 206/387; 221/87; 220/8, 220/307; 312/12; 242/199

[56] References Cited

U.S. PATENT DOCUMENTS

| | | | |
|---|---|---|---|
| 3,015,408 | 1/1962 | Campbell et al. | 220/307 |
| 3,603,478 | 9/1971 | Connan | 221/87 |
| 3,638,788 | 2/1972 | Solomon | 206/387 |
| 3,746,180 | 7/1973 | Spiroch et al. | 206/387 |
| 3,759,465 | 9/1973 | Janssen et al. | 242/199 |
| 3,909,088 | 9/1975 | Dennehey | 312/12 |
| 4,030,602 | 6/1977 | Muller et al. | 220/8 |
| 4,098,402 | 7/1978 | Rogg | 206/387 |
| 4,140,219 | 2/1979 | Somers | 206/387 |

FOREIGN PATENT DOCUMENTS

| | | | |
|---|---|---|---|
| 1498288 | 9/1967 | France | 242/199 |
| 734857 | 8/1955 | United Kingdom | 220/307 |

Primary Examiner—William T. Dixson, Jr.
Attorney, Agent, or Firm—Woodard, Weikart, Emhardt & Naughton

[57] ABSTRACT

A protective cap for protecting the magnetic tape of a tape cassette from damage and exposure to dust while the tape cassette is not in operation. A plastic strip covers the apertures of the engaging wall of the tape cassette and is held in position by prongs integral therewith. The prongs project into the apertures. The plastic strip can be removed by gripping it at one end at which it extends beyond the end of the wall and by pulling it away from the tape cassette.

9 Claims, 7 Drawing Figures

PROTECTIVE CAP FOR A MAGNETIC RECORDING TAPE CASSETTE

BACKGROUND OF THE INVENTION

1. Field of the Invention

The field of the invention is devices which protect magnetic recording tape cassettes when such cassettes are not in use.

2. Description of the Prior Art

Magnetic recording tape cassettes, including both 8-track cartriges and the smaller, standardized tape cassette are in widespread use today because of their versatility and convenience in use. However certain problems are presented in storing and protecting these cassettes when they are not in use. If a cassette is left unprotected, the magnetic tape is sometimes damaged by becoming entangled. Also the constant exposure of the tape to the exterior of the cassette allows dust to accumulate. This accumulation diminishes the playing quality of the tape and necessitates the more frequent cleaning of the recording heads of the tape player.

In the prior art, there are storage cases which protect magnetic tapes from this type of damage. Two such devices are disclosed in U.S. Pat. No. 3,909,088 to Dennehey and U.S. Pat. No. 4,140,219 to Somers. Storage cases such as these protect the tape cassette by completely enclosing it. Enclosure of the cassette is typically accomplished by means of a two piece housing in which the housing members pivot with respect to each other. Some devices in the prior art also provide for the storage of the storage cases or alternatively store a multiple number of tape cassettes. The storage case of Dennehey and additionally the storage case of Rogg (U.S. Pat. No. 4,098,402) provide for a modular interlocking of the storage cases. U.S. Pat. No. 3,603,478 to Connan discloses a storage case which provides for the storage of a multiple number of tape cassettes directly.

U.S. Pat. No. 3,638,788 to Solomon discloses a cassette cover which is a sheet of material which can be folded to enclose a tape cassette. The cassette cover is maintained about the tape cassette by an interlocking through the spool holes of the cassette.

Although each of the above devices of the prior art provide for the protection of the tape cassette when it is not in use, there are several unresolved inconveniences related to their use. For example, because the tape cassette is completely enclosed when it is being stored in one of these cases, it is usually desirable to put the title of the stored cassette on the storage case. This necessitates matching the cassette to its appropriately titled storage case each time the cassette is to be stored. Alternatively, the storage case may be constructed with a visible window which shows the area of the cassette identifying the subject of the tape. However, this adds to the cost of producing the storage case. Because of the overall size of the cases, they present their own storage problem when the cassettes are not being stored within the cases. It is sometimes an inconvenient procedure to store and remove the cassettes from the storage case. Furthermore, each of the prior art devices is relatively larger, substantially enclosing the tape cassette.

SUMMARY OF THE INVENTION

In general terms the present invention is a protective cap which protects the magnetic tape of a tape cassette from damage and exposure to dust while the cassette is not in operation. A strip of material covers the apertures of the wall of the cassette through which wall the tape is accessible. The strip of material is held in position by prongs which extend into the apertures. The strip extends beyond at least one end of the engaging wall so that the strip can be easily gripped and removed.

One object of the present invention is to provide a tape protecting device which is convenient to use and is inexpensive to make, while providing the same extent of protection as cassette storage cases.

Another object of the invention is to provide an improved type of protective device.

Other devices and advantages of the present invention will become more apparent in the following diagrams and description of the preferred embodiments.

DESCRIPTION OF THE PREFERRED EMBODIMENTS

Figure 1:
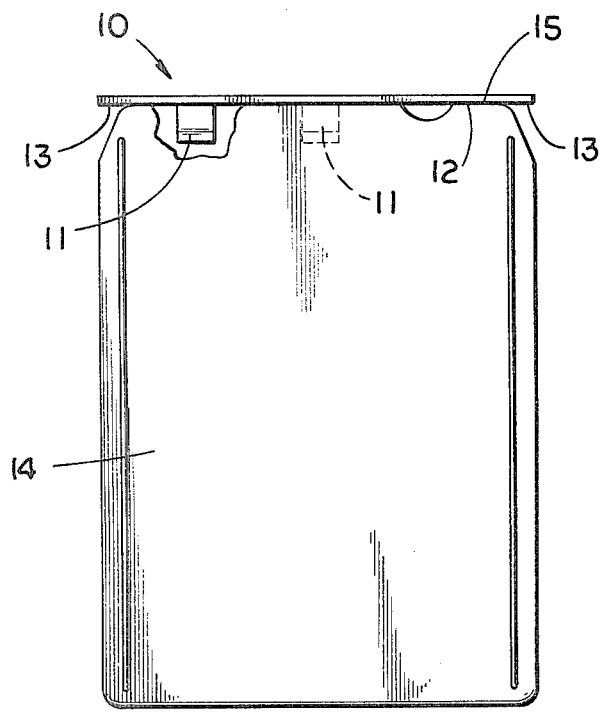
FIG. 1 is a side elevational, partial fragmentary view of an 8-track cartridge with a protective cap covering the engaging wall of the cassette.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention is a convenient and inexpensive cap which protects the tape of a magnetic recording tape cassette from damage when the cassette is not in use. The cap can be easily attached and removed. When the cap is in place the title of the cassette is still visible, therefore the matching of a cassette to an appropriate cap having the same title as the cassette is unnecessary. Its smallness in size makes it a simple matter to store the cap when it is not in use and makes it relatively inexpensive to produce.

Referring now to FIG. 1, protective cap 10 is fixedly attached to 8-track cartridge 14. Protective cap 10 includes a plastic strip 12 and has four prongs 11 which project outwardly from one side of strip 12 and into the interior of 8-track cartridge 14. In this attached position plastic strip 12 is juxtaposed to a generally flat wall 15 with prongs 11 projecting into 8-track cartridge 14 through apertures 16 in the wall 15. The portions 13 of strip 12 extend beyond the ends of the wall 15 so that protective cap 10 may be easily gripped and removed.

Figure 1B:
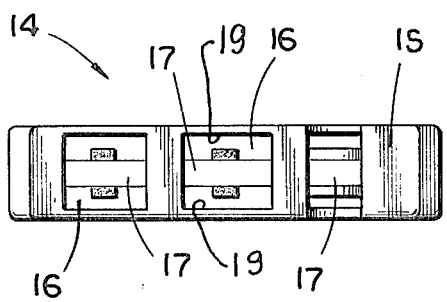
FIG. 1B is a top plan view of the 8-track tape cartridge of FIG. 1.
Figure 1A:
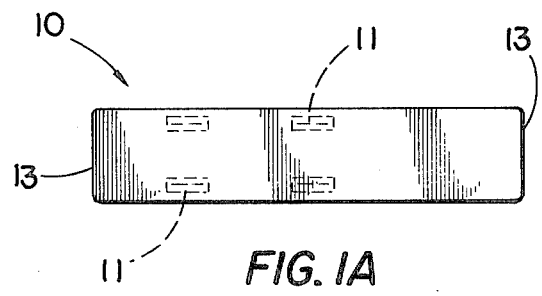
FIG. 1A is a top plan view of the protective cap of FIG. 1.
Figure 1C:
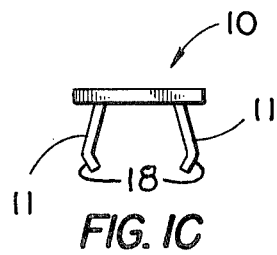
FIG. 1C is a side elevational view of the protective cap of FIG. 1.

The prongs 11 are made of plastic and are integrally constructed with strip 12. In the preferred embodiment, there are two pairs of prongs 11, each pair being laterally spaced apart approximately the width of apertures 16. FIG. 1A shows the laterally spaced relationship of prongs 11. FIG. 1B illustrates apertures 16 into which prongs 11 are inserted and also shows portions of magnetic tape 17 which are exposed by apertures 16. FIG. 1C illustrates the generally bowed shape of prongs 11. Prongs 11 are shaped in this manner and are resilient in order to facilitate mounting the strip 12 in a position alongside the wall 15 of 8-track cartridge 14. The inwardly pointed end portions 18 are guided into the apertures 16 by the inside surfaces 19 of the cartridge causing the bowed pins to be resiliently biased inwardly and to grip the inside surfaces 19 when the cap is in the installed or attached position. Prongs 11 are each approximately ¼" long. It is preferable that prongs 11 be less than ½" long so that they may be completely inserted into apertures 16 when protective cap 10 is attached to 8-track cartridge 14.

Figure 2:
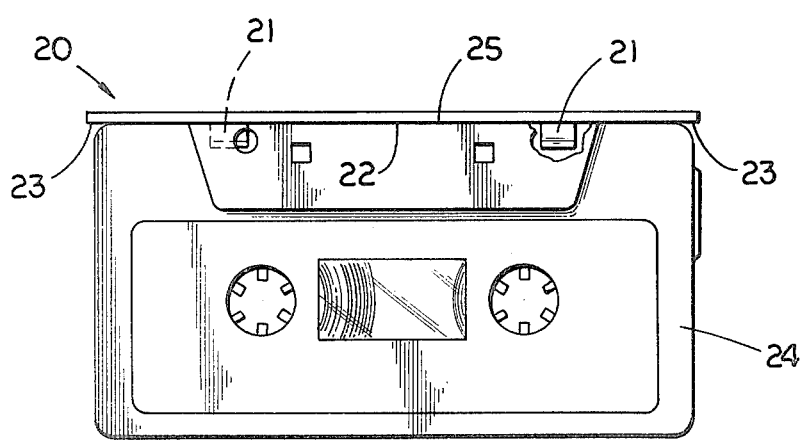
FIG. 2 is a side elevational, partial fragmentary view of a tape cassette with a protective cap covering the engaging wall of the cassette.
Figure 2B:
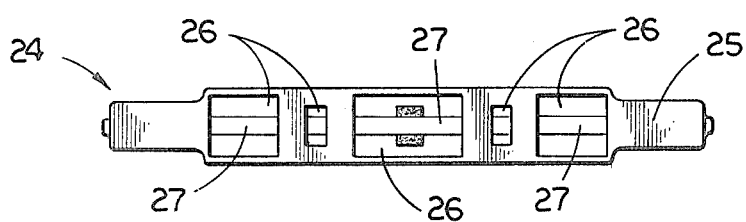
FIG. 2B is a top plan view of the tape cassette of FIG. 2.

A second preferred embodiment, designed for use with another type of standardized tape cassette 24 is illustrated in FIGS. 2 through 2B. Referring now to FIG. 2, protective cap 20 is illustrated as fixedly attached to cassette 24. The cap 20 includes a plastic strip 22 and four prongs 21 projecting outwardly from one side of strip 22. In the installed position the prongs project into the interior of cassette 24. In this attached position plastic strip 22 is located alongside a generally flat wall 25 of the cassette with the prongs 21 projecting into cassette 24 through apertures 26 in the wall 25. The end portions 23 of strip 22 extend beyond the ends of engaging wall 25 so that protective cap 20 may be easily gripped and removed.

Figure 2A:
FIG. 2A is a top plan of the protective cap of FIG. 2.

Prongs 21, having the same characteristics as prongs 11, are made of plastic and are integrally constructed with strip 22. There are two pairs of prongs 21, each pair being laterally spaced apart approximately the width of apertures 27 (FIG. 2A). FIG. 2B illustrates apertures 27 into which prongs 21 are inserted and also shows portions of magnetic tape 27 which are exposed by apertures 26. Prongs 21 have the same generally bowed shape as prongs 11 and are resilient in order to maintain strip 22 in the illustrated attached position. Prongs 21 are each approximately 3/16" long. It is preferable that the prongs 21 be less than ¼" long so that they may be completely inserted into apertures 27 when protective cap 20 is attached to tape cassette 24.

There are variations in the above described preferred embodiments which are still within the spirit of the invention. For example, the length, width and overall shape of prongs 11 and 21 may be varied according to design preferences and the dimensions of the particular tape cassette being protected. It is not necessary that strips 12 and 22 be made of plastic or be integrally constructed with prongs 11 and 21, respectively. Also, strips 12 and 22 may extend beyond any edge of engaging walls 15 and 25 to provide a means of removal. Therefore while there have been described above the principles of this invention in connection with specific apparatus it is to be clearly understood that this description is made only by way of example and not as a limitation as to the scope of the invention.

What is claimed is:

1. A protective cap for use with a tape cassette containing magnetic recording tape and including one generally flat wall defining at least one aperture which exposes said magnetic tape, said protective cap comprising:
   (a) a strip adapted to be juxtaposed to the outside surface of said wall and covering all of said apertures defined by said wall, said strip extending beyond at least one edge portion of said wall and extending to at most the width of said wall; and
   (b) means for maintaining said strip in position juxtaposed to the outside surface of said wall, said means including at least two prongs which project from one side of said strip and are adapted to project into one of said defined apertures, said prongs being spaced apart approximately the width of said aperture into which said prongs project.

2. The protective cap of claim 1 in which said prongs are resilient.

3. The protective cap of claim 1 in which said strip includes plastic material.

4. The protective cap of claim 1 in which said prongs include plastic material.

5. The protective cap of claim 3 in which said prongs are integral with said strip.

6. The protective cap of claim 1 in which said prongs have a generally bowed shape and in which said prongs have end portions projecting inwardly toward one another.

7. A protective cap in combination with a tape cassette containing magnetic recording tape and including one generally flat wall, defining at least one aperture which exposes said magnetic tape, said protective cap comprising:
   (a) a strip, juxtaposed to the outside surface of said wall and covering all of said apertures defined by said wall, said strip extending beyond at most the two ends of said wall, and extending to at most the width of said wall; and
   (b) means for maintaining said strip in position juxtaposed to the outside surface of said wall, said means including at least two prongs.

8. A protective cap for use with a tape cassette containing magnetic recording tape and including one generally flat wall defining at least one aperture which exposes said magnetic tape, said protective cap comprising:
   (a) a strip adapted to be juxtaposed to the outside surface of said wall and covering all of said apertures defined by said wall, said strip extending to at most the width of said wall;
   (b) means for maintaining said strip in position juxtaposed to the outside surface of said wall, said means including at least two prongs which project from one side of said strip and are adapted to project into one of said defined apertures, said prongs being spaced apart approximately the width of said aperture into which said prongs project; and
   (c) means for removing said strip from juxtaposition with the outside surface of said wall.

9. A protective cap in combination with a tape cassette containing magnetic recording tape and including one generally flat wall, defining at least one aperture which exposes said magnetic tape, said protective cap comprising:
   (a) a strip, said strip being juxtaposed to the outside surface of said wall and covering all of said apertures defined by said wall, said strip extending to at most the width of said wall;
   (b) means for maintaining said strip in position juxtaposed to the outside surface of said wall, said means including at least two prongs; and
   (c) means for removing said strip from juxtaposition to the outside surface of said wall, said means including said strip extending beyond an edge portion of said wall.

* * * * *